United States Patent  (10) Patent No.: US 8,237,989 B2
Herron et al.  (45) Date of Patent: Aug. 7, 2012

(54) METHOD TO IMPROVE A HALFTONE BY COMBINING HALFTONING WITH ALGORITHMIC PROCESSING

(75) Inventors: Stephen K. Herron, Ladera Ranch, CA (US); William Kress, Mission Viejo, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1923 days.

(21) Appl. No.: 10/888,883

(22) Filed: Jul. 9, 2004

(65) Prior Publication Data

US 2006/0007492 A1 Jan. 12, 2006

(51) Int. Cl.
*H04N 1/405* (2006.01)
(52) U.S. Cl. ...... 358/3.06; 358/1.9; 358/3.13; 358/3.14; 358/3.19; 358/533; 358/534; 358/535; 358/536
(58) Field of Classification Search ................. 358/3.26, 358/534–536, 2.99–3.23
See application file for complete search history.

(56) References Cited

U.S. PATENT DOCUMENTS

| 4,595,948 | A | * | 6/1986 | Itoh et al. ................. 358/500 |
| 4,686,538 | A | * | 8/1987 | Kouzato ...................... 347/15 |
| 5,291,311 | A | * | 3/1994 | Miller ...................... 358/3.23 |
| 5,463,720 | A | | 10/1995 | Granger |
| 5,493,322 | A | * | 2/1996 | Ng et al. ................... 347/240 |
| 5,548,407 | A | * | 8/1996 | von Kienlin et al. .......... 358/1.9 |
| 5,586,203 | A | | 12/1996 | Spaulding et al. |
| 5,602,971 | A | * | 2/1997 | Deschuytere .............. 358/1.9 |
| 5,608,822 | A | * | 3/1997 | Carlebach .................. 382/270 |
| 5,610,999 | A | | 3/1997 | Bannai et al. |
| 5,696,853 | A | | 12/1997 | Kawana et al. |
| 5,700,610 | A | | 12/1997 | Bosschaerts et al. |
| 5,818,604 | A | | 10/1998 | Delabasita et al. |
| 5,842,451 | A | | 12/1998 | von Eisebeck et al. |
| 5,946,452 | A | | 8/1999 | Spaulding et al. |
| 6,081,349 | A | * | 6/2000 | Ebitani et al. ............... 358/3.19 |
| 6,091,849 | A | * | 7/2000 | Spaulding et al. ........... 382/162 |
| 6,532,082 | B1 | | 3/2003 | Dewitte |
| 6,606,168 | B1 | | 8/2003 | Rylander |
| 6,714,320 | B1 | * | 3/2004 | Nakahara et al. ........... 358/3.13 |
| 7,009,736 | B2 | * | 3/2006 | Thakur ...................... 358/3.06 |
| 2002/0080377 | A1 | | 6/2002 | Tonami et al. |
| 2003/0035146 | A1 | | 2/2003 | Yu et al. |
| 2003/0081228 | A1 | | 5/2003 | Spaulding et al. |
| 2003/0128378 | A1 | | 7/2003 | Cooper et al. |
| 2003/0210431 | A1 | * | 11/2003 | Rylander .................... 358/3.06 |
| 2004/0042047 | A1 | * | 3/2004 | Kawatoko et al. .......... 358/3.06 |

(Continued)

*Primary Examiner* — Richard Zhu
(74) *Attorney, Agent, or Firm* — SoCal IP Law Group LLP; Steven C. Sereboff; Jonathan Pearce

(57) ABSTRACT

The present invention is directed to a system and method for halftone screening. A system for halftone screening includes means adapted to receive image data having a number of tonal levels representative of a continuous tone image. The system further includes a memory including a LUT having a number of alternative halftone cell arrangements for each tonal level. Each cell of the LUT consists of a number of device dots describing a particular gray value. For each gray value, there are several alternative cells with different arrangements of the same number of device dots. The LUT is configured with the cells of different arrangements in rows. The rows increase in the number of device dots; hence, each column describes halftone cells of increasing tonal values. The system then communicates the image data having a tonal level to the LUT, and randomly selects a halftone cell arrangement to generate a halftone output.

12 Claims, 3 Drawing Sheets

U.S. PATENT DOCUMENTS

2004/0051717 A1    3/2004    Naiki
2004/0057080 A1    3/2004    Loce et al.
2005/0179949 A1*   8/2005    Hagai .......................... 358/3.03

* cited by examiner

METHOD TO IMPROVE A HALFTONE BY COMBINING HALFTONING WITH ALGORITHMIC PROCESSING

BACKGROUND OF THE INVENTION

The present invention relates generally to halftone screening processes and, more particularly, to a system and method to improve a halftone by combining halftoning with algorithmic processing.

Halftone screening transforms a continuous tone image into a binary image that is to be rendered and perceived by an observer as the original continuous tone image. Halftone screening processes typically apply a halftone screens to a continuous tone image. The result is binary image that appears to be made up of patterns or groups of individual black and white printer device dots. Each pattern or group has a proportion and arrangement of black and white dots so as to render, from a distance, an impression of a selected level of gray. Thus, when a halftone image is observed from a typical viewing distance, it appears as an original, continuous tone image. Currently, halftone screening is used in printing devices such as conventional printing presses, laser printers, dot matrix printers, and inkjet printers; and the like.

Halftoning is necessary because printing devices are not capable of producing all of the shades or colors often contained in continuous tone images. For example, a laser printer may have only one color of ink; typically, black. There are no grays. Halftoning permits the appearance of a number of shades of gray.

Halftone screens are created using screen frequencies, typically measured in lines per unit of length, such as lines per inch (lpi). Thus, a screen frequency is often represented by a grid. Each square in the grid then represents a halftone cell capable of holding a halftone dot pattern. Higher screen frequencies produce finer halftone screens, while lower screen frequencies produce coarser halftone screens. Further, multiple screen frequencies are represented by multiple grid or halftone screens.

To convert a continuous tone image into a halftone image, a halftone screen or grid is typically superimposed on the continuous tone image. Each halftone cell in the halftone screen or grid is then assigned a different sized dot to represent the continuous tone image data for that halftone cell. Again, when all of the dots are viewed together at a normal viewing distance, the dots appear as the original continuous tone image.

The size of the halftone cells is determined by the interaction of the selected screen frequency with the resolution of a printer's device resolution. The word "printer" refers to any mechanism that makes marks on a physical substrate. A printer creates an electronic version of the halftone screen, while screening software applies an electronic dot pattern to the electronic image. The image recorder resolution setting reflects the image recorder's ability to place device dots close together.

For example, in a typical laser printer, rollers pull a sheet of paper from a paper tray and through a "charge roller," which gives the paper an electrostatic charge. Simultaneously, a printing drum is given an opposite charge. The surface of the drum is then scanned by a laser in accordance with the image recorder, discharging portions of the drum surface, and leaving only those points corresponding to the desired text and/or image with a charge. This charge is then used to adhere toner to the drum surface. The paper and the drum are then brought into contact, the differing charges attracting the toner to the paper. The paper then travels between "fusing rollers" which heat the paper and melt the toner, fusing the toner to the paper.

Thus, the closer together the image recorder can place the spots, the higher the image recorder resolution. Further, device dots composing the grid are commonly referred to as "printer dots" and image recorder resolution is measured in dots per inch (dpi), and may also be represented by a grid.

When the halftone grid is laid over the resolution grid, each halftone cell is filled with device dots. Groups of device dots form halftone dots. Thus, each of the halftone cells in the previous example is comprised of many device dots that are created by the image recorder, forming the halftone dots. Each of these device dots created by the laser is selectively turned on, producing a final output, e.g., gray scale, or turned off, producing no output or white.

The combination of device dots within a halftone cell produces a halftone dot of a specific size and shape. For example, if the halftone dot needs to be bigger, the laser turns on more device dots. Similarly, if the halftone dot needs to be smaller, the laser turns on fewer imagesetter spots. To create different shapes, the image recorder turns the imagesetter spots on in different sequences. Each sequence is determined by a mathematical equation referred to as a spot function or, more commonly, by a sequence of numbers referred to as a threshold array. Different spot functions and array sequences exist for each dot shape. Common shapes include round, diamond, line, square and elliptical.

Halftone names can be confusing. For example, there are two types of square shaped halftones. In one of these, the halftone dots are shaped like squares all the way through the tint or grey scale. In the other, the halftone dots start out shaped like circles, grow to square shapes in the midtones, and then become circular again. In addition, different manufacturers of printing devices use different spot functions to create halftone dots. Thus, not every manufacturer's round or square dots, for example, grow in exactly the same way.

One print standard, commonly referred to as PostScript, Adobe Systems, has emerged which includes a system for handling gray levels. PostScript has a number of ways of defining screening patterns that are built into the language and also provides for proprietary methods. PostScript requires 256 levels of gray to properly reproduce a continuous tone image. Because of this requirement, manufacturers have adopted 256 gray levels as a de facto standard.

Generally, it is desirable to expand halftone technology beyond the technologies supported by the PostScript specification. Further, it is also desirable to remove artifacts commonly found in halftone screens. Such artifacts include bands and optical jumps in gray levels. For example, half screens typically use the same dot pattern for over and over for a particular tone level, though other dot patterns for that tone level are possible. Thus, the halftone cells at many tone levels have a non-symmetrical arrangement that visually appear as bands. Further, the touch points between adjacent halftone cells are also non-symmetrical and appear as optical jumps in gray levels. These visual artifacts will be referred to hereinafter as "noise."

Thus, there exists a need for a system and method that customizes a halftone screen to better reproduce certain image properties such as spatial frequencies and contrast. Further, a need also exists for a system and method that has the ability to eliminate certain noise problems commonly associated with screening such as touch point density growth and patterning.

SUMMARY OF THE PRESENT INVENTION

The present invention customizes a halftone screen to better reproduce certain images eliminating certain noise problems commonly associated with screening such as touch point density growth and patterning. The invention is directed to a system and method for halftone screening. More particularly, the present invention is directed to improve a halftone by combining halftoning with algorithmic processing.

In accordance with the present invention, there is provided a system for halftone screening. The system comprises means adapted to receive image data having a number of tonal levels representative of a continuous tone image. The system advantageously includes a memory including a look up table (LUT), the LUT including each of the number of tonal levels and a number of alternative halftone cell arrangements for each tonal level. The system teaches means adapted for communicating the image data having a tonal level to the LUT, and randomly selecting a halftone cell arrangement whereby a halftone output is generated therefrom.

Further in accordance with the present invention, there is provided a method of halftone screening. The method comprises receiving image data having a number of tonal levels representative of a continuous tone image. The method further includes generating a LUT, wherein the LUT includes each of the number of tonal levels and a number of alternative halftone cell arrangements for each tonal level. The method also teaches communicating the image data having a tonal level to the LUT, and randomly selecting a halftone cell arrangement whereby a halftone output is generated therefrom.

Additional advantages and novel features of the invention will be set forth in part in the description which follows, and in part will become apparent to those skilled in the art upon examination of the following or may be learned by practice of the invention. Such advantages of the invention may be realized and attained by various structures and methods as covered by the patent claims and the equivalents thereto.

BRIEF DESCRIPTION OF THE DRAWINGS

The accompanying figures incorporated in and forming a part of the specification, illustrates several aspects of the present invention, and together with the description serve to explain the principles of the invention. In the figures.

DETAILED DESCRIPTION OF PREFERRED AND ALTERNATE EMBODIMENTS

The present invention is directed to a system and method to customize a halftone screen to better reproduce certain images by eliminating certain noise problems commonly associated with halftone screening such as touch-point density growth and patterning. As used herein, the term halftone screening refers to processes used to transform a continuous tone image into a binary image that may be rendered and perceived by an observer as the original continuous tone image. Halftone screening is suitable in visual output rendering devices or printing devices such as, for example, laser printers.

Typically, halftone screens use the same dot pattern over and over for a particular tone level, though other dot patterns for that particular tone level are possible. Thus, the halftone cells at many tone levels have a non-symmetrical arrangement that results in the visual appearance of bands. Further, the touch points between adjacent halftone cells are also non-symmetrical and result in the appearance of optical jumps in gray levels. These visual artifacts are referred to herein as "noise." In contrast, the present invention varies the shape or arrangement of each dot cluster from halftone cell to halftone cell thereby eliminating the appearance of bands and optical jumps in gray levels. To this end, the present invention uses random dot selection.

Figure 1:
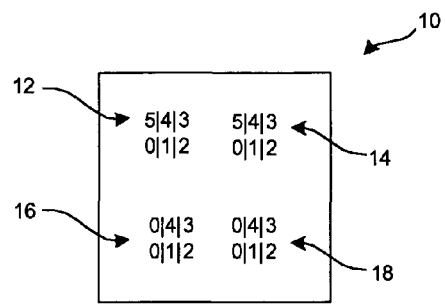
FIG. 1 is an illustration of an arrangement of a four-centered cell in accordance with principles of the present invention.

For example, turning to FIG. 1, there is presented an arrangement 10 of a four-centered cell, the centers indicated at reference numerals 12, 14, 16, and 18, respectively, wherein the number 0 indicates no dot on. In repetitive use, arrangement 10 will result in the visual appearance of bands and optical jumps in the gray level. More specifically, the extra device dot, indicated by the number 5, will resemble a band of large dots alternating with a band of smaller dots.

Figure 2:
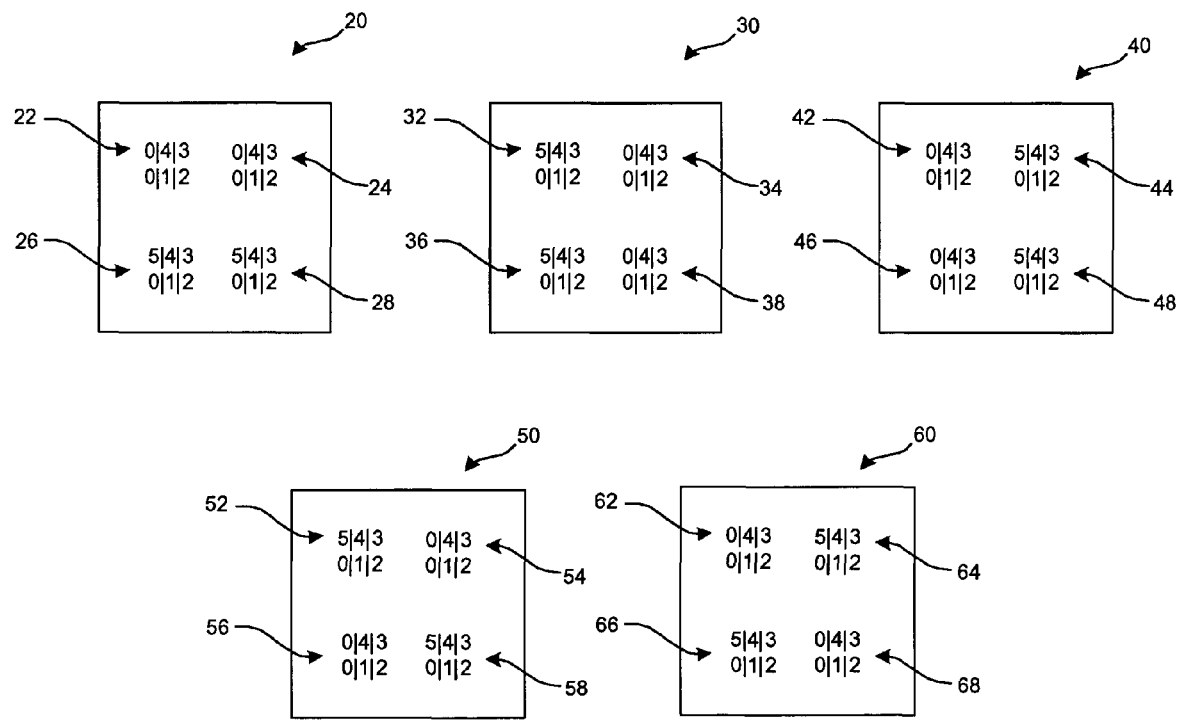
FIG. 2 illustrates five other possible arrangements of a four-centered cell.

However, there are five other possible arrangements of a four-centered cluster at the thirtieth gray level. FIG. 2 shows these five other possible arrangements at reference numerals 20, 30, 40, 50, and 60. The centers are indicated at reference numerals 22, 24, 26, and 28; 32, 34, 36, and 38; 42, 44, 46, and 48; 52, 54, 56, and 58; and 62, 64, 66, and 68, respectively. Repetitive use, of any one of these five arrangements 20, 30, 40, 50, 60 will also result in the visual appearance of bands and optical jumps in the gray level.

Referring to FIGS. 1 and 2, and in accordance with principles of the present invention, the six arrangements 10, 20, 30, 40, 50, 60 are imaged in a random manner. The random order of the six arrangements 10, 20, 30, 40, 50, 60 breaks up the bands and provides the visual appearance of an even gray tone.

As will be described hereinafter, the arrangements 10, 20, 30, 40, 50, 60 are suitably encoded in six data strings of numbers stored in a look up table (LUT). The selection of the current cell arrangement is made either with a random number generator, by mixing the use order, or by some other suitable algorithm. It is the random selection or mixing of the use order that requires intelligence, and combines halftoning with algorithmic processing, thereby improving a halftone.

Figure 3:
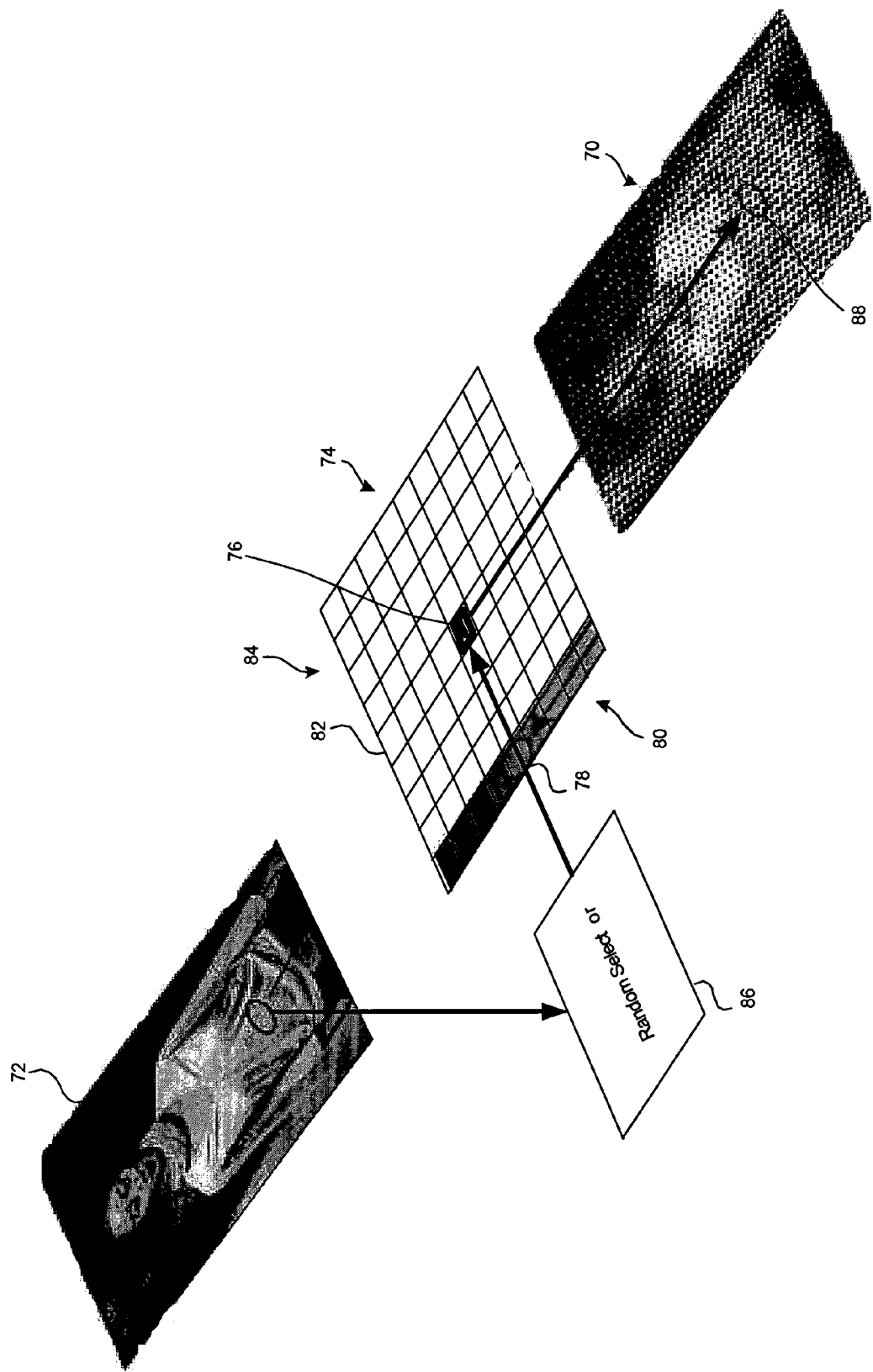
FIG. 3 illustrates a halftone with random selection of halftone cells.

Turning now to FIG. 3, there is presented an illustration of a halftone image 70 generated from a continuous tone image 72 using random selection of halftone cells and a LUT 74 consisting of several halftone cells for each gray value. Gray values are shown in columns and halftone cells in rows. FIG. 3 shows a selection of a halftone cell describing a mid-range gray device dot pattern. As will be appreciated by those of ordinary skill in the art, LUT 74 is suitably stored in any commonly used form of electronic memory. More specifically, LUT 74 is a two-dimensional table containing a series of halftone cell arrangements, one of which is indicated at reference numeral 76. Further, and as also illustrated, two-dimensional LUT 74 relates gray scales, e.g., tonal levels, one of which is indicated at reference numeral 78, arranged in rows 80 to alternative cell patterns or arrangements, one of which is indicated at reference numeral 82, arranged in columns 84. Those of ordinary skill in the art will appreciate that, in the alternative, rows 80 are suitably data strings containing alternative cell arrangements, such as, for example, those arrangements 10, 20, 30, 40, 50, 60 shown in FIGS. 1 and 2.

Still referring to FIG. 3, to generate the halftone image 70, the continuous-tone's gray values are input into a random selector 86. Random selector 86 suitably includes a random number generator to select the halftone cell 76 in columns 84 and rows or selects another cell in the same mid-range row. Those of ordinary skill in the art will appreciate that some other method of random selection or mixing the use order may be used without departing from the spirit of the present invention. While the algorithmic component in the exemplary embodiment selects from various halftone screens by random selection, any method of selection is capable of being employed without departing from the subject invention. For example, any mathematical formula, e.g., prime numbers, by average of previous halftone selection, by heuristics, by neural network, or the like, are advantageously used to select from the various halftone screens.

More specifically, and as illustrated, random number selector 86 selects hafltone cell 76. The selected arrangement 76 is used to generate a halftone output 88. The selection process is then repeated, iteratively, for each gray value from the linearization curve to generate halftone image 70.

Thus, as will be appreciated by those of ordinary skill in the art, the present invention customizes a halftone screen to eliminate certain noise problems commonly associated with halftone screening such as touch point density growth and patterning commonly seen as banding and/or optical jumps in the gray level by randomly selecting or varying the use order of possible halftone cell arrangements.

Generally, a halftone screen in accordance with principles of the present invention contains a LUT of alternative device dot arrangements and an algorithm capable of selecting one of the arrangements, such as, for example, described in conjunction with FIG. 3. Thus, a suitable format includes a description for a halftone in accordance with principles of the present invention. Such a description includes the type, name, and resolution of the halftone. The description further includes a two-dimensional LUT having a certain number of columns and rows. The description also includes alternative arrangements of halftone cells for one or more tonal levels, and the JAVA code in the random selector for LUT selections.

In use, the present invention contemplates that the controller of a printer would perform operations that prepare a LUT based on the description, populate the LUT with the halftone arrays associated with the various arrangements, compile the JAVA code, and prepare for the image tonal values. The JAVA code is suitably configured to perform the following additional functions as desired. The JAVA code, selects from various halftone screens the one most appropriate to duplicate the spatial resolution, e.g., diffusion dither for high frequency and halftone for low frequency.

Figure 4:
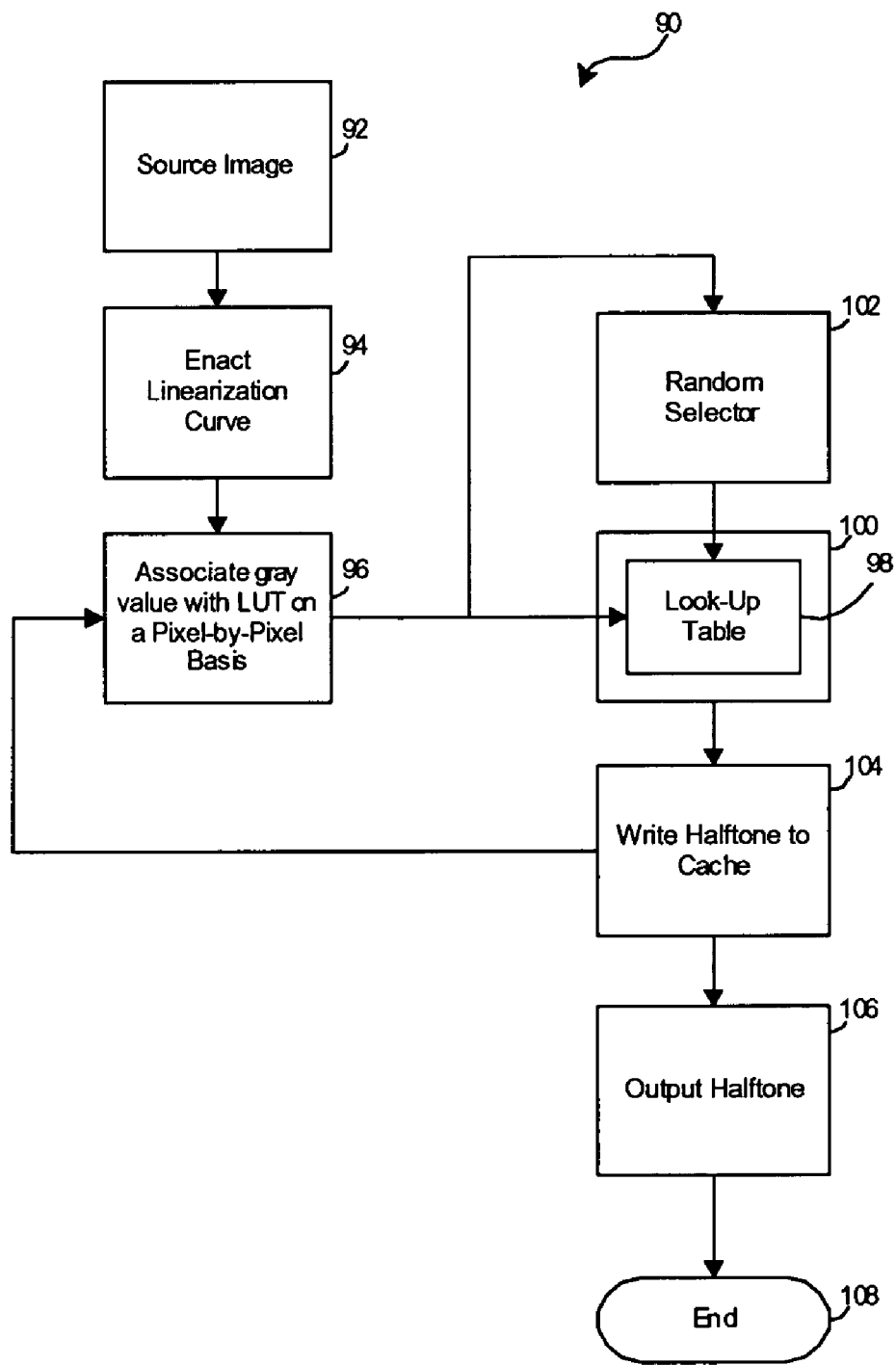
FIG. 4 is a flowchart illustrating the program flow of a halftoning method in accordance with principles of the present invention.

Turning to FIG. 4, a flowchart illustrating the program flow of a screening method in accordance with principles of the present invention is shown. As will be appreciated by those of ordinary skill in the art, such a program is executed by a processor such as a raster image processor (RIP) or a POST-SCRIPT processor commonly implemented in or used in conjunction with printing devices.

The program 90 begins in step 92 wherein a continuous tone image is sourced. Next, in step 94, a linearization curve is enacted and replaces the sourced image's gray values with the corresponding gray values from the linearization curve. Thus, the tonal levels are visually linear. The skilled artisan will appreciate that the inclusion of the linearization curve is for exemplary purposes only and the subject invention is adaptable to employ any method known in the art to replace the gray values in the sourced image.

In step 96, each gray value, e.g., pixel, from the linearization curve is, in turn, associated with a row of corresponding halftone cell arrangements in LUT 98 stored in memory 100. Further, in step 102, a random selector as suitably implemented in JAVA code, as described hereinabove, is activated to randomly select one of the halftone cells arrangements in the row of halftone cell arrangements indexed in step 96.

The randomly selected halftone cell arrangement is then written to cache in step 104 and the processing returns to step 96 for the next pixel. Once a random selection has been made for all of the pixels, a halftone image is output in step 106, and the program 90 ends in step 108.

The foregoing description of preferred embodiments of the invention have been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of the ordinary skilled in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. A system for halftone screening comprising:
   means adapted to receive image data having a number of image tonal levels representative of a continuous tone image;
   means adapted for receiving description data corresponding to an identified halftone type corresponding to an associated document rendering device;
   means adapted for associating each image tonal level of received image data in an m row by n column planar array with a corresponding number of halftone tonal levels associated with a selected linearization curve corresponding to a screen frequency of the associated document rendering device, wherein m and n are each integers greater than 2;
   a memory including a two dimensional look up table (LUT), the LUT including a halftone cell value corresponding to each of the number of halftone tonal levels defined in a first dimension of the LUT, wherein each halftone cell value includes data representative of a plurality of alternative halftone cell arrangements, each having a relatively unique cluster shape defined by a random dot-growth pattern, for each tonal level defined in a second dimension, wherein each plurality of alternative halftone cell arrangements corresponds to an element of the LUT in the first dimension, and wherein each available halftone level associated with an image rendering operation is pre-stored in the LUT;
   means adapted for receiving electronic image data comprised of a plurality of dot values;
   means for communicating each of a plurality of dot values corresponding to the LUT;
   means adapted for selecting a halftone level from the LUT for each dot value;
   means adapted for receiving a plurality of random numbers defined within a range of a number of storage locations in the second dimension; and
   means adapted for randomly selecting a halftone cell arrangement from the plurality of corresponding cell values for each halftone tonal level associated with each dot value for each tonal value within a row and for each tonal value within a column in accordance with iterative application of the random numbers to address the second dimension of the LUT so as to select a single entry therefrom, whereby a halftone output is generated therefrom.

2. The system of halftone screening of claim 1, further comprising means adapted for generating a halftone image from the halftone output.

3. The system of halftone screening of claim 1, further comprising an algorithm for randomly selecting the halftone cell arrangement.

4. The system of halftone screening of claim 1, wherein a random number generator is configured to make the random selection.

5. The system of halftone screening of claim 1, wherein the random selection is made by selecting the halftone cell arrangements.

6. The system of halftone screening of claim 1, wherein the number of alternative halftone cell arrangements for each tonal level are arranged in respective data strings.

7. A method of halftone screening, comprising the steps of:
receiving image data having a number of image tonal levels representative of a continuous tone image;
receiving description data corresponding to an identified halftone type corresponding to an associated document rendering device;
associating each image tonal level of received image data in an m row by n column planar array with a corresponding number of halftone tonal levels associated with a selected linearization curve corresponding to a screen frequency of the associated document rendering device, wherein m and n are each integers greater than 2;
populating a two dimensional look up table (LUT), wherein the LUT includes a halftone cell value corresponding to each of the number of halftone tonal levels defined in a first dimension of the LUT, wherein each halftone cell value includes data representative of a plurality of alternative halftone cell arrangements, each having a relatively unique cluster shape defined by a random dot-growth pattern, for each tonal level defined in a second dimension, wherein each plurality corresponds to an element of the LUT in the first dimension, and wherein each available halftone level associated with an image rendering operation is pre-stored in the LUT;
receiving electronic image data comprised of a plurality of dot values;
communicating each of a plurality of dot values corresponding to the LUT;
selecting a halftone level from the LUT for each dot value;
receiving a plurality of random numbers defined within a range of a number of storage locations in the second dimension; and
randomly selecting a halftone cell arrangement from the plurality of corresponding cell values for each halftone tonal level associated with each dot value for each tonal value within a row and for each tonal value within a column in accordance with iterative application of the random numbers to address the second dimension of the LUT so as to select a single entry therefrom, whereby a halftone output is generated therefrom.

8. The method of claim 7, further comprising the step of generating a halftone image from the halftone output.

9. The method of claim 7, wherein the random selection is made using an algorithm to select the halftone cell.

10. The method of claim 7, wherein the random selection is made using a random number generator.

11. The method of claim 7, wherein the random selection is made by mixing the use order of the number of alternative halftone cell arrangements.

12. The method of claim 7, wherein the number of alternative halftone cell arrangements for each tonal level are arranged in respective data strings.

* * * * *